Patented Mar. 1, 1949

2,462,830

UNITED STATES PATENT OFFICE 2,462,830

FUNGICIDE COMPRISING 1-METHOXY-4-CHLOROBUTENE-2

Oliver W. Cass, Niagara Falls, N. Y., assignor to E. I. du Pont de Nemours & Company, Wilmington, Del., a corporation of Delaware No Drawing. Application August 31, 1946, Serial No. 694,433

2 Claims. (Cl. 167—22)

This invention relates to fungi control and, more particularly, it relates to new fungicidal compositions and a method of inhibiting fungi growth.

The deterioration of many articles subject to fungi growth, especially in tropical climates, has been a problem of long standing. Articles made of leather, paper, cloth, and the like, are particularly subject to fungi growth.

It is an object of this invention to provide a new, volatile, fungicidal composition suitable for use in packaging articles subject to fungi growth.

It is another object of this invention to provide a method of inhibiting and destroying the growth of fungi on articles subject to fungi growth.

Other objects of the invention will appear hereinafter.

The objects of this invention may be accomplished by preparing a fungicidal composition containing a di-substituted unbranched 2-butene of the formula:

$$C_4H_6XY$$

in which X and Y designate substituents taken from this group consisting of chlorine and an alkoxy group containing not to exceed four carbon atoms.

The fungicidal composition containing the di-substituted unbranched 2-butene may be placed adjacent to an article subject to fungi growth to inhibit or destroy said growth. The above-said class of di-substituted butenes are sufficiently volatile to surround the article with a gaseous atmosphere which will prevent or greatly inhibit fungi growth.

The fungicidal compositions of this invention may be prepared by admixing the same with an inert carrier which may be either a liquid or a solid, depending upon how the fungicidal composition is to be used. The composition may be prepared with a liquid carrier by dissolving or forming a finely divided dispersion thereof in an inert liquid, for example, water, methyl, ethyl or propyl alcohol, hydrocarbon solvent, or the like. Such liquid, fungicidal composition may be coated on the surface of the article to be protected against fungi growth. Alternatively, the fungicidal composition may be prepared with a solid carrier by admixing the said di-substituted butene with a finely divided, inert, solid material, for example, charcoal, silica gel, clay, fuller's earth, or the like. Such dry, solid, fungicidal composition may be placed in a box or package with the article to be protected. If desired, the finely divided, dry, fungicidal composition may be pelleted and used in that form. The quantity of carrier, whether liquid or solid, which is added to the fungicidal agent, can be varied between wide limits, depending upon the strength of the fungicide desired in the composition. The carrier may, therefore, comprise between 5% and 90% of the ultimate composition.

The di-substituted 2-butenes included in the formula above set forth are, generally, known chemical compounds. The alkoxy derivatives included in the above-said formula, although not chemically new compounds, are not common. These alkoxy derivatives may be prepared by reacting dichloro-butenes with a sodium alkoxide having not to exceed four carbon atoms. The dichlorobutene is dissolved in an alcohol at atmospheric conditions of temperature and pressure. This solution is then slowly added with stirring to a solution of the desired sodium alkoxide. The alcohol used is preferably the same as that from which the alkoxide was prepared, e. g., when using sodium ethoxide, ethanol is used as the solvent. A mild exothermic reaction takes place. The materials are then boiled until the reaction is complete. Lower temperature may be used; however, the time required for the substantial completion of the reaction will be much greater.

If one alkoxy group is desired in the material, the dichlorobutene and sodium alkoxide are used in equimolar quantities. Correspondingly, if two alkoxy groups are desired in the final product, two moles of the alkoxide are used for each mol of the dichlorobutene used.

The reaction is complete when a test portion of the solution is no longer alkaline. In some cases, reaction may not proceed to 100% completion, but stops after reaching 90% to 95% completion. In such case, the reaction is stopped when the alkalinity reaches a minimum value. Sodium chloride formed as a by-product is filtered off, the solvent is then removed by distillation, and the product purified by fractional distillation.

The following examples are given to illustrate, in detail, the production of 1-ethoxy-4-chlorobutene-2, 1,4-dimethoxy butene-2, and 1-ethoxy-3-chlorobutene-2, respectively. These examples are not to be considered as in any way limiting the scope of the invention.

EXAMPLE I

The reactor consisted of a one-liter flask, equipped with a stirrer, thermometer, reflux condenser, and dropping funnel. Two hundred and fifty (250) cc. of ethanol and 62.5 grams (0.5 mole) of 1,4-dichlorobutene-2 were placed in the reactor. After starting the stirrer, a solution of sodium ethylate, prepared by dissolving 11.5 grams (0.5 mole) of sodium in small pieces in 150 cc. of ethanol, was slowly added to the reaction flask during the course of thirty minutes. A mild exothermic reaction took place, the solution turned yellowish-orange and sodium chloride began to separate out almost immediately. After all the reactants had been added together, the mixture was boiled for three hours, at which time a test sample showed the reaction to be complete. The mixture was cooled and filtered to remove by-product sodium chloride, the solvent removed by distillation and the product purified by fractional distillation. Twenty-three (23) grams of 1-ethoxy-4-chlorobutene-2, B. P. 168.7–171.0° C. at 20 mm., was obtained. The material had a mild, pleasant, spicy odor and possessed the following physical constants: $d_4^{20}=0.969$; $n_D^{20}=1.4437$.

EXAMPLE II

The reactor was identical to that used in Example I. Three hundred (300) cc. of methanol and 62.5 grams (0.5 mole) of 1,4-dichlorobutene-2 were placed in the reactor and the stirrer started. To this was slowly added a solution of sodium methylate, prepared by dissolving 23 grams (1.0 mole) of sodium in small portions in 500 cc. of methanol. During the addition of the sodium methylate solution, which took thirty minutes, a mild exothermic reaction took place. The solution turned orange-yellow in color and sodium chloride began to separate out. The mixture was then boiled for five and one-half hours at which time no further reduction in alkalinity of the solution was noticeable. After cooling and filtering off the by-product sodium chloride, the excess methanol was removed by distillation and the product purified by fractional distillation. Thirty-three (33) grams of 1,4-dimethoxy butene-2 were obtained which had the following physical constants: B. P. = 141.5–142.5° C. at 745 mm.; $d_4^{20}=0.874$; $n_D^{20}=1.4271$.

EXAMPLE III

The reactor was the same as used in Example I. Twenty-three (23) grams (1.0 mole) of sodium was added in small portions to 750 cc. of ethanol. This solution was placed in the reactor and the stirrer started. Then 125 grams (1.0 mole) of 1,3-dichlorobutene-2 was added during the course of thirty minutes during which time a mild exothermic reaction took place. The solution turned yellowish-orange and sodium chloride began to precipitate. The reaction mixture was then heated to reflux temperature for a period of four hours at which point the alkalinity of the solution reached a minimum. At the end of this time the reaction mixture was diluted with three times its volume of water, the oil product separated, dried over anhydrous calcium chloride and distilled. Forty-two (42) grams of 1-ethoxy-3-chlorobutene-2 were obtained having the following physical constants: B. P. = 125.5–125° C. at 743.9 mm., $d_4^{20}=1.004$; $n_D^{20}=1.4399$; molecular refraction = 30.90 (calc. 31.40).

The fungicidal compositions of the present invention were tested to determine the fungicidal value thereof in the following manner. Six fungi were used to evaluate all compounds tested:

Monilia (Crassa)
*Aspergillus niger*
Penicillium sp.
Spicaria sp.
Rhizopus sp.
*Glicocladium fimbriatum*

These fungi were grown on a solid nutrient agar containing 10 grams of glucose, 5.0 grams of peptone, 0.5 of magnesium sulfate, 1.0 gram of monopotassium sulfate, 15 grams agar, and 1000 cc. of water.

Petri dishes were used for the test, the top and bottom sections sealed at their edges to form a growth chamber. The composition under test as a fungicide was placed in a glass cup 8 mm. in diameter and 5 mm. high, cemented to the center of the lower half of the Petri dish. After sterilization of the dishes, 10 cc. of molten, sterile agar was poured into the top half of the growth chamber. After the agar solidified, spores of the six fungi were transferred onto six individual positions on the agar surfaces. One-tenth (0.1) gram of the fungicidal composition being tested was placed in the cup, the section containing the inoculated agar placed on top, and the chamber sealed with an adhesive tape. The chambers were incubated for five days at 30° C. Degree of growth was determined each day by comparison with two or more control chambers containing no fungicide.

After five days, the fungi not showing a definite growth were transferred to agar slants of the same composition by removing agar at the point of inoculation and spreading it over the slant. If growth occurred on the slant, it indicated that the material under test was completely fungistatic under the conditions used, but not fungicidal for the species.

All materials which were completely fungicidal in the preliminary tests described above were then subjected to a dilution test conducted as follows: The tests were conducted in five- to six-liter bell jars resting on glass squares to which they were sealed by a thin layer of lubricant. The material to be tested was placed in four small, filter paper cups if solid, or, if liquid, run onto four small, rectangular pieces of filter paper. The cups or paper rectangles were held equally spaced around the inside, about half way up the jar, by a circle of adhesive tape. The fungi were inoculated onto agar in half of a Petri dish, the same as in the preceding test, and the dish set under the bell jar on the glass plate.

Tests were made with enough material to give a vapor concentration of 1:20,000 and 1:60,000 with seven of the eight substances set forth in the table below, and 1:120,000 with four of the eight substances in said table. The results of these fungicidal tests, as applied to eight representative compounds of this invention, are given in the following table.

Table

| Compound | V. P. at 30° C. | Screening Test | Dilution Tests | | |
|---|---|---|---|---|---|
| | | | 1/20,000 | 1/60,000 | 1/120,000 |
| | | | Per cent | Per cent | Per cent |
| 1,3-dichlorobutene-2 | 17.0 | 100 | 100 | 100 | 100 |
| 1,4-dichlorobutene-2 | 6.5 | 100 | 100 | 100 | 100 |
| butene-2 diallyl ether | 0.5 | 90 | | | |
| 1,4-dimethoxy butene-2 | 10.0 | 95 | 97 | 50 | |
| 1-ethoxy-3-chlorobutene-2 | 7.5 | 100 | 100 | 49 | |
| 1-ethoxy-4-chlorobutene-2 | 2.5 | 100 | 100 | 100 | 100 |
| 1-methoxy-3-chlorobutene-2 | 20.0 | 100 | 100 | | |
| 1-methoxy-4-chlorobutene-2 | 6.0 | 100 | 100 | 100 | 100 |

The examples given above are for the purpose of illustration of fungicidal properties of members of this group of compounds, but it is not intended to restrict the invention to these examples.

The six species of fungi tested are representative of fungi most generally encountered in the handling and shipment of goods. It has, furthermore, been established that materials which are fungicidal to the above-said six fungi are fungicidal to fungi in general.

The fungicides of the present invention may be, if desired, combined with other known fungicidal agents, for example, paraformaldehyde, camphor, p-dichlorobenzene, naphthalene, and the like.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. A fungicidal composition comprising, as a fungicidal agent, 1-methoxy-4-chlorobutene-2 and, as a carrier, a finely divided, inert solid.

2. The process of inhibiting and destroying fungi growth which comprises placing in contact with an article subject to fungi growth 1-methoxy-4-chlorobutene-2.

OLIVER W. CASS.

REFERENCES CITED

The following references are of record in the file of this patent:

UNITED STATES PATENTS

| Number | Name | Date |
|---|---|---|
| 2,057,044 | Meisenburg | Oct. 13, 1936 |
| 2,424,520 | Tonkin | July 22, 1947 |

FOREIGN PATENTS

| Number | Country | Date |
|---|---|---|
| 103,206 | Australia | Feb. 7, 1938 |